United States Patent
Hsu

(10) Patent No.: US 8,945,427 B2
(45) Date of Patent: *Feb. 3, 2015

(54) ELECTRICALLY CONDUCTIVE POLYMER COMPOSITIONS AND FILMS MADE THEREFROM

(75) Inventors: Che-Hsiung Hsu, Clemmons, NC (US); Veevin Tsao Kuo Hsu, legal representative, Clemmons, NC (US)

(73) Assignee: E I du Pont de Nemours and Company, Wilmington, DE (US)

(*) Notice: Subject to any disclaimer, the term of this patent is extended or adjusted under 35 U.S.C. 154(b) by 459 days.

This patent is subject to a terminal disclaimer.

(21) Appl. No.: 13/265,002

(22) PCT Filed: Apr. 23, 2010

(86) PCT No.: PCT/US2010/032175
§ 371 (c)(1),
(2), (4) Date: Oct. 18, 2011

(87) PCT Pub. No.: WO2010/124166
PCT Pub. Date: Oct. 28, 2010

(65) Prior Publication Data
US 2012/0145966 A1 Jun. 14, 2012

Related U.S. Application Data

(60) Provisional application No. 61/172,396, filed on Apr. 24, 2009.

(51) Int. Cl.
*H01B 1/00* (2006.01)
*H01B 1/12* (2006.01)
(Continued)

(52) U.S. Cl.
CPC ............... *H01B 1/127* (2013.01); *B82Y 30/00* (2013.01); *C08J 3/03* (2013.01); *C08L 65/00* (2013.01); *C08L 101/12* (2013.01); *H01B 1/122* (2013.01); *H01B 1/128* (2013.01); *C08G 2261/3223* (2013.01); *C08G 2261/512* (2013.01);
(Continued)

(58) Field of Classification Search
None
See application file for complete search history.

(56) References Cited

U.S. PATENT DOCUMENTS 3,282,875 A   11/1966   Donald et al.
4,358,545 A   11/1982   Ezzell et al.

(Continued)

FOREIGN PATENT DOCUMENTS

CN   1439029 A   8/2003
CN   1685031 A   10/2005

(Continued)

OTHER PUBLICATIONS

Appleby et al.,—Polymeric Perfluoro Bis-Sulfonimides as Possible Fuel Cell Electrolytes, J. Electrochem. Soc., 1993 vol. 140 pp. 109-111.

(Continued)

*Primary Examiner* — Harold Pyon
*Assistant Examiner* — Jaison Thomas

(57) ABSTRACT

The present disclosure relates to electrically conductive polymer compositions, and their use in electronic devices. The compositions are an aqueous dispersion including: (i) at least one electrically conductive polymer doped with a non-fluorinated polymeric acid; (ii) at least one highly-fluorinated acid polymer; and (iii) electrically insulative oxide nanoparticles.

20 Claims, 1 Drawing Sheet

(51) Int. Cl.
*B82Y 30/00* (2011.01)
*C08J 3/03* (2006.01)
*C08L 65/00* (2006.01)
*C08L 101/12* (2006.01)
*C08K 3/36* (2006.01)
*C08L 25/18* (2006.01)
*C08L 27/18* (2006.01)

(52) U.S. Cl.
CPC ....... *C08G2261/794* (2013.01); *C08J 2300/12* (2013.01); *C08J 2365/00* (2013.01); *C08J 2427/18* (2013.01); *C08K 3/36* (2013.01); *C08L 25/18* (2013.01); *C08L 27/18* (2013.01); *Y10S 977/773* (2013.01)
USPC .......................................... 252/500; 977/773

(56) References Cited

U.S. PATENT DOCUMENTS

| | | |
|---|---|---|
| 4,433,082 A | 2/1984 | Grot et al. |
| 4,552,927 A | 11/1985 | Warren |
| 4,731,408 A | 3/1988 | Jasne |
| 4,795,543 A | 1/1989 | Stetter et al. |
| 4,869,979 A | 9/1989 | Ohtani et al. |
| 4,940,525 A | 7/1990 | Ezzell |
| 4,959,430 A | 9/1990 | Jonas et al. |
| 5,002,700 A | 3/1991 | Otagawa et al. |
| 5,069,820 A | 12/1991 | Jen et al. |
| 5,160,457 A | 11/1992 | Elsenbaumer |
| 5,185,100 A | 2/1993 | Han et al. |
| 5,247,190 A | 9/1993 | Friend et al. |
| 5,286,413 A | 2/1994 | Hannecart et al. |
| 5,300,575 A | 4/1994 | Jonas et al. |
| 5,317,169 A | 5/1994 | Nakano et al. |
| 5,378,402 A | 1/1995 | Cross et al. |
| 5,463,005 A | 10/1995 | Desmarteau |
| 5,537,000 A | 7/1996 | Alivisatos et al. |
| 5,705,888 A | 1/1998 | Staring et al. |
| 5,798,170 A | 8/1998 | Zhang et al. |
| 5,863,465 A | 1/1999 | Kinlen |
| 5,917,279 A | 6/1999 | Elschner et al. |
| 5,986,400 A | 11/1999 | Staring et al. |
| 5,994,496 A | 11/1999 | Van Haare et al. |
| 6,097,147 A | 8/2000 | Baldo et al. |
| 6,150,426 A | 11/2000 | Curtin et al. |
| 6,210,790 B1 | 4/2001 | Crivello |
| 6,303,238 B1 | 10/2001 | Thompson et al. |
| 6,303,943 B1 | 10/2001 | Yu et al. |
| 6,319,428 B1 | 11/2001 | Michot et al. |
| 6,324,091 B1 | 11/2001 | Gryko et al. |
| 6,337,370 B1 | 1/2002 | Bae et al. |
| 6,358,437 B1 | 3/2002 | Jonas et al. |
| 6,515,314 B1 | 2/2003 | Duggal et al. |
| 6,593,690 B1 | 7/2003 | McCormick et al. |
| 6,632,472 B2 | 10/2003 | Louwet et al. |
| 6,670,645 B2 | 12/2003 | Grushin et al. |
| 6,706,963 B2 | 3/2004 | Gaudiana et al. |
| 6,717,358 B1 | 4/2004 | Liao et al. |
| 6,756,474 B2 | 6/2004 | Hsu |
| 6,830,828 B2 | 12/2004 | Thompson et al. |
| 6,875,523 B2 | 4/2005 | Grushin et al. |
| 6,923,881 B2 | 8/2005 | Tateishi et al. |
| 6,924,047 B2 | 8/2005 | Radu et al. |
| 6,963,005 B2 | 11/2005 | Lecloux et al. |
| 7,112,369 B2 | 9/2006 | Wang et al. |
| 7,166,010 B2 | 1/2007 | Lamansky et al. |
| 7,189,771 B2 | 3/2007 | Hsu |
| 7,211,824 B2 | 5/2007 | Lazarev |
| 7,244,797 B2 | 7/2007 | Kurihara et al. |
| 7,250,461 B2 * | 7/2007 | Hsu et al. ................ 524/445 |
| 7,307,276 B2 | 12/2007 | Andriessen |
| 7,317,047 B2 * | 1/2008 | Hsu .......................... 524/165 |
| 7,338,620 B2 * | 3/2008 | Hsu et al. ................. 252/500 |
| 7,351,358 B2 * | 4/2008 | Hsu et al. ................. 252/500 |
| 7,354,532 B2 * | 4/2008 | Hsu et al. ................. 252/511 |
| 7,371,336 B2 * | 5/2008 | Hsu et al. ............. 252/301.35 |
| 7,390,438 B2 * | 6/2008 | Hsu et al. ................. 252/500 |
| 7,431,866 B2 | 10/2008 | Hsu et al. |
| 7,455,793 B2 | 11/2008 | Hsu et al. |
| 7,462,298 B2 | 12/2008 | Hsu et al. |
| 7,569,158 B2 | 8/2009 | Waller et al. |
| 7,593,004 B2 | 9/2009 | Spath et al. |
| 7,727,421 B2 | 6/2010 | Hsu et al. |
| 7,749,407 B2 | 7/2010 | Hsu et al. |
| 7,837,901 B2 | 11/2010 | Hsu et al. |
| 7,837,902 B2 * | 11/2010 | Hsu et al. ................. 252/500 |
| 8,338,512 B2 * | 12/2012 | Hsu ........................... 524/165 |
| 8,455,865 B2 * | 6/2013 | Hsu ............................ 257/40 |
| 2001/0019782 A1 | 9/2001 | Igarashi et al. |
| 2001/0038937 A1 | 11/2001 | Suzuki et al. |
| 2002/0009680 A1 | 1/2002 | Majumdar |
| 2002/0017612 A1 | 2/2002 | Yu et al. |
| 2002/0038999 A1 | 4/2002 | Cao |
| 2002/0041151 A1 | 4/2002 | Park et al. |
| 2002/0098377 A1 | 7/2002 | Cao et al. |
| 2002/0099119 A1 | 7/2002 | Craig |
| 2002/0127381 A1 | 9/2002 | Will et al. |
| 2002/0190250 A1 | 12/2002 | Grushin et al. |
| 2002/0192476 A1 | 12/2002 | Kambe et al. |
| 2003/0020073 A1 | 1/2003 | Long et al. |
| 2003/0108771 A1 | 6/2003 | Lecloux et al. |
| 2003/0118829 A1 | 6/2003 | Hsu |
| 2003/0213952 A1 | 11/2003 | Iechi et al. |
| 2004/0009346 A1 | 1/2004 | Jang et al. |
| 2004/0036067 A1 | 2/2004 | Andriessen |
| 2004/0072987 A1 | 4/2004 | Groenendaal et al. |
| 2004/0092700 A1 | 5/2004 | Hsu |
| 2004/0102577 A1 | 5/2004 | Hsu et al. |
| 2004/0124504 A1 | 7/2004 | Hsu |
| 2004/0127637 A1 | 7/2004 | Hsu et al. |
| 2004/0149952 A1 | 8/2004 | DePenning et al. |
| 2004/0149962 A1 | 8/2004 | Andriessen |
| 2004/0206942 A1 | 10/2004 | Hsu |
| 2004/0217877 A1 | 11/2004 | Kokonaski et al. |
| 2004/0222413 A1 | 11/2004 | Hsu et al. |
| 2004/0254297 A1 | 12/2004 | Hsu et al. |
| 2004/0262599 A1 | 12/2004 | Bernds |
| 2005/0070654 A1 | 3/2005 | Hsu |
| 2005/0089679 A1 | 4/2005 | Ittel et al. |
| 2005/0124784 A1 | 6/2005 | Sotzing |
| 2005/0184287 A1 | 8/2005 | Herron et al. |
| 2005/0205860 A1 | 9/2005 | Hsu et al. |
| 2005/0208328 A1 | 9/2005 | Hsu et al. |
| 2005/0209388 A1 | 9/2005 | Hsu et al. |
| 2005/0209392 A1 | 9/2005 | Luo et al. |
| 2005/0222333 A1 | 10/2005 | Hsu |
| 2005/0224765 A1 | 10/2005 | Hsu et al. |
| 2005/0224788 A1 | 10/2005 | Hsu et al. |
| 2006/0051401 A1 | 3/2006 | Manohar |
| 2006/0076050 A1 | 4/2006 | Williams et al. |
| 2006/0076557 A1 | 4/2006 | Waller et al. |
| 2006/0076577 A1 | 4/2006 | Boos et al. |
| 2006/0113510 A1 | 6/2006 | Luo et al. |
| 2006/0180810 A1 | 8/2006 | Lee et al. |
| 2006/0274049 A1 | 12/2006 | Spath et al. |
| 2006/0289843 A1 | 12/2006 | Hsu et al. |
| 2006/0292362 A1 | 12/2006 | Hsu et al. |
| 2007/0045591 A1 | 3/2007 | Hsu et al. |
| 2007/0069184 A1 | 3/2007 | Hsu et al. |
| 2007/0096082 A1 | 5/2007 | Gaynor et al. |
| 2007/0298530 A1 | 12/2007 | Feehery |
| 2008/0128662 A1 | 6/2008 | Hsu et al. |
| 2008/0135809 A1 | 6/2008 | Hsu |
| 2008/0213594 A1 | 9/2008 | Hsu |
| 2008/0248314 A1 | 10/2008 | Hsu et al. |
| 2008/0251768 A1 | 10/2008 | Hsu et al. |
| 2008/0258605 A1 | 10/2008 | Yukinobu |
| 2008/0283800 A1 | 11/2008 | Hsu |
| 2008/0296536 A1 | 12/2008 | Hsu et al. |
| 2009/0008609 A1 | 1/2009 | Yeisley et al. |
| 2009/0072201 A1 | 3/2009 | Hsu et al. |
| 2009/0114884 A1 | 5/2009 | Hsu |

(56) References Cited

U.S. PATENT DOCUMENTS

| | | | |
|---|---|---|---|
| 2009/0154059 A1 | 6/2009 | Wessling et al. | |
| 2010/0187982 A1* | 7/2010 | Hsu et al. | 313/504 |
| 2010/0247923 A1* | 9/2010 | Hsu | 428/419 |

FOREIGN PATENT DOCUMENTS

| | | |
|---|---|---|
| DE | 4334390 A1 | 4/1995 |
| EP | 560721 A2 | 9/1993 |
| EP | 440957 A2 | 3/1996 |
| EP | 488321 B1 | 10/1997 |
| EP | 817540 A2 | 1/1998 |
| EP | 593111 A1 | 6/1998 |
| EP | 1231251 A1 | 8/2002 |
| EP | 1286569 A1 | 2/2003 |
| EP | 962943 B1 | 12/2003 |
| EP | 1371709 A1 | 12/2003 |
| EP | 1408563 A2 | 4/2004 |
| EP | 1026152 B1 | 7/2006 |
| EP | 1191614 B1 | 5/2009 |
| EP | 1191612 B1 | 9/2009 |
| EP | 1726051 B1 | 12/2010 |
| FR | 2632979 A1 | 12/1989 |
| GB | 2124635 A | 2/1984 |
| JP | 62119237 A | 5/1987 |
| JP | 01038808 B | 8/1989 |
| JP | 02249221 A | 10/1990 |
| JP | 04234453 A | 8/1992 |
| JP | 05129162 A | 5/1993 |
| JP | 09176310 A | 7/1997 |
| JP | 11186103 A | 7/1999 |
| JP | 11353934 A | 12/1999 |
| JP | 2000505249 A | 4/2000 |
| JP | 2001006878 A | 1/2001 |
| JP | 2001270999 A | 10/2001 |
| JP | 2001325831 A | 11/2001 |
| JP | 2002500408 A | 1/2002 |
| JP | 2002082082 A | 3/2002 |
| JP | 2002246177 A | 8/2002 |
| JP | 2003187983 A | 7/2003 |
| JP | 2003217862 A | 7/2003 |
| JP | 2003297582 A | 10/2003 |
| JP | 2004500449 T | 1/2004 |
| JP | 2004502004 A | 1/2004 |
| JP | 2004082395 A | 3/2004 |
| JP | 2005537348 A | 12/2005 |
| JP | 2006500461 A | 1/2006 |
| JP | 2006108064 A | 4/2006 |
| JP | 2006527277 A | 11/2006 |
| JP | 2007502531 T | 2/2007 |
| JP | 2007529607 A | 10/2007 |
| JP | 2009540505 A | 11/2009 |
| JP | 2010514904 A | 5/2010 |
| JP | 2010534739 A | 11/2010 |
| JP | 2011517468 A | 6/2011 |
| JP | 2012524831 A | 10/2012 |
| WO | 9831716 A1 | 7/1998 |
| WO | 9934371 A1 | 7/1999 |
| WO | 9952954 A1 | 10/1999 |
| WO | 0070655 A2 | 11/2000 |
| WO | 0138219 A1 | 5/2001 |
| WO | 0141230 A1 | 6/2001 |
| WO | 0141512 A1 | 6/2001 |
| WO | 0199207 A2 | 12/2001 |
| WO | 0200759 A1 | 1/2002 |
| WO | 0202714 A2 | 1/2002 |
| WO | 0215645 A1 | 2/2002 |
| WO | 02065484 A1 | 8/2002 |
| WO | 02099907 A1 | 12/2002 |
| WO | 03006515 A1 | 1/2003 |
| WO | 03006537 A1 | 1/2003 |
| WO | 03008424 A1 | 1/2003 |
| WO | 03012908 A2 | 2/2003 |
| WO | 03040257 A1 | 5/2003 |
| WO | 03046540 A1 | 6/2003 |
| WO | 03050824 A1 | 6/2003 |
| WO | 03063555 A1 | 7/2003 |
| WO | 03074601 A2 | 9/2003 |
| WO | 03091688 A2 | 11/2003 |
| WO | 2004016710 A1 | 2/2004 |
| WO | 2004020444 A1 | 3/2004 |
| WO | 2004020502 A1 | 3/2004 |
| WO | 2004029128 A2 | 4/2004 |
| WO | 2004029133 A1 | 4/2004 |
| WO | 2004029176 A1 | 4/2004 |
| WO | 2004094501 A2 | 11/2004 |
| WO | 2004105150 A1 | 12/2004 |
| WO | 2005003083 A1 | 1/2005 |
| WO | 2005018012 A1 | 2/2005 |
| WO | 2005024853 A1 | 3/2005 |
| WO | 2005041217 A1 | 5/2005 |
| WO | 2005052027 A1 | 6/2005 |
| WO | 2005080525 A2 | 9/2005 |
| WO | 2005090435 A1 | 9/2005 |
| WO | 2005090436 A1 | 9/2005 |
| WO | 2005093872 A1 | 10/2005 |
| WO | 2005121217 A1 | 12/2005 |
| WO | 2006073968 A2 | 7/2006 |
| WO | 2006078264 A2 | 7/2006 |
| WO | 2007002681 A2 | 1/2007 |
| WO | 2007002740 A2 | 1/2007 |
| WO | 2007092296 A2 | 8/2007 |
| WO | 2007120143 A1 | 10/2007 |
| WO | 2007145977 A1 | 12/2007 |
| WO | 2008082663 A1 | 7/2008 |
| WO | 2009018009 | 2/2009 |
| WO | 2009117460 A1 | 9/2009 |
| WO | 2010123962 A2 | 10/2010 |

OTHER PUBLICATIONS

Arnautov et al., New Dopant-Solvent System for Conductive PAN Films Production, Synthetic Metals, 1997, vol. 84, No. 1-3, pp. 133-134, Elsevier Science S.A.

Baytron Coating Guide Issue Oct. 2002—Obtained From www.hcstarck-echemicals.com.

Baytron H. C. Stark Gmbh (Brochure) No Date.

Baytron P Vap A1 4083 and Baytron P VP CH 8000 Product Information for Electronic Grades Designed for Use as Hole-Injection Material in OLEDs—Obtained From www.hcstarck-echemicals.com.

Baytron Product info from baytron.com; Aug. 1, 2007.

Brown et al, "Built-in field electroabsorbtion spectroscopy of plymer light-emitting diodes incorporating a doped poly (3,4-ethylene dioxythiophene) hole injection layer," Applied Physics Letters, AIP, American Institute of Physics, vol. 75, No. 12, Sep. 20, 1999, pp. 1679-1681.

Cen et al., 1,1,2,2-Tetrafluoro-2-(polyfluoroalkoxy)ethanesulfonic Acids, 1,1,2,2-Tetrafluoro-2-(perfluoroalkoxy) ethanesulfonic Acids, and 2,2'-Oxybis(1,1,2,2-tetrafluoroethanesulfonic acid), Inorganic Chemistry, 1988, vol. 27, pp. 1376-1377, American Chemical Society.

Colvin et al—Light-Emitting Diodes Made From Cadmium Selenide Nanocrystals and a Semiconducting Polymer, Nature, 1994, vol. 370 pp. 354-357.

Conductive Polymer From Wikipedia, the Free Encyclopedia.

Database CA [Online] Chemical Abstracts Service, Columbus, OH, US; Jan. 9, 1988, Iwata, Kaoru et al: "Dopants for electrically conductive polymers" XP002335513 retrieved from STN Database accession No. 1988:7040 abstract.

Database CA [Online] Chemical Abstracts Service, Columbus, Ohio, US; Takei, Masashi et al: Metal colloid solution, electric conductor ink, electric conductor coating, and undercoating film for forming electric conductor coating layer, retrieved from STN Database accession No. 2001:847689.

Database CA [Online] Chemical Abstracts Service, Columbus, Ohio, US; Wakita, Katsuya et al: "High performance odor sensors and mthod for their manufacture," retrieved from STN Database accession No. 2002:219874.

(56) References Cited

OTHER PUBLICATIONS

Database CA [Online] Chemical Abstracts Service, Morimoto, Takeshi et al: "Solid Electrolytic Capacitor having Electrically Conductive Plymer on Dielectric Oxide Film" Database Accession No. 1991:113460, American Chemical Society, Columbus, OH, Oct. 5, 1990.

Desmarteau, Novel Perfluorinated Ionomers and Ionenes, J. Fluorine Chem., 1995, vol. 72, pp. 203-208.

Downs C et al: "Efficient Polymerization of Aniline at Carbon Nanotube Electrodes", Advanced Materials, vol. 11, No. 12, Jan. 1, 1999, pp. 1028-1031.

Feiring et al., "Aromatic Monomers with Pendant Fluoroalkylsulfonate and Sulfonimide Groups," Journal of Fluorine Chemistry, 2000, vol. 105, pp. 129-135.

Feiring et al., "Novel Aromatic Polymers with Pendant Lithium Perfluoroalkylsulfonate or Sulfinimide Groups," Macromolecules, 2000, vol. 33, pp. 9262-9271.

Fowler J D et al: "Hydrogen detection by Polyaniline nanofibers on gold and platinum electrodes", The Journal of Physical Chemistry C, vol. 113, No. 16, Sep. 4, 2001, pp. 6444-6449.

Gustafsson et al.—Flexible Light-Emitting Diodes Made From Soluble Conducting Polymers, Nature 1992 vol. 357 pp. 477-479.

Hirai et al; "Electrochemical Behaviors of Polypyrrole, Poly-3-Methyl-thiophene, and Polyaniline Deposited on Nafion-Coated Electrodes," Journal of the Electrochemical Society, vol. 135, No. 5, May 1, 1988, pp. 1132-1137, Electrochemical Society, Manchester, NH.

Hsu, C.-H., Novel Preparation and Properties of Conductive Polyaniline/Nafion® Film, Synthetic Metals, 1991, 671-674,41-43, Elsevier Sequoia, The Netherlands.

Huang et al., "Well-Dispersed Single-Walled Carbon Nanotube/Polyaniline Composite Films," Carbon, vol. 41, 2003, pp. 2731-2736.

Iijima et al.—Single-Shell Carbon Nanotubes of 1-nm Diameter, Nature, 1993 vol. 363 pp. 603-605.

Ivanov et al, The Study of Carbon Nanotubules Produced by Catalytic Method, Chem. Phys. Lett. 1994, vol. 223 pp. 329-335.

Journet et al.,—Large-Scale Production of Single-Walled Carbon Nanotubes by the Electric-Arc Technique, Nature, 1997 vol. 388 pp. 756-758.

Kim et al., "Enhancement of Electrical Conductivity of Poly(3,4-ethylenedioxythiophene)/Poly(4-styrenesulfonate) by a Change of Solvents," Synthetic Metals, Elsevier Sequoia, vol. 126, No. 2/3, pp. 311-316, Feb. 2002.

Kitani et al; "Properties of Elastic Polyaniline," Synthetic Metals, vol. 84, No. 1-3, 1997, pp. 83-84, Elsevier Science S. A.

Lee et al, Poly(thieno(3,4-b)thiophene) A New Stable Low Band Gap Conducting Polymer, Macromolecules 2001 vol. 34 pp. 5746-5747.

Levi et al—Polymer and Cathode Emission Studies of Polymer-Based Light-Emitting Diodes Under Strong Electrial Pulse Excitation, Journal of Applied Physics, 2000 vol. 88 No. 5 pp. 2548-2552.

Li et al—Large-Scale Synthesis of Aligned Carbon Nanotubes, Science, 1996 vol. 274 pp. 1701-1703.

Lim et al—Degradation of Organic Light-Emitting Devices Due to Formation and Growth of Dark Spots, Materials Science and Engineering 2001, pp. 154-159.

Madler et al—Visibly Transparent and Radiopaque Inorganic Organic Composites From Flange-Made Mixed-Oxide Fillers. Journal of Nanoparticle Research, vol. 8, No. 3-4, 2005, p. 323-333.

Riedel et al., Tailored Highly Transparent Composite Hole-Injection Layer Consisting of PETOT: PSS and SiO2 Nanoparticles for Efficient Polymer Light-Emitting Diodes, Advanced Materials, 2011 vol. 23 p. 740-745.

Römpp Chemistry Dictionary, 9th Edition, 1993.

Schroedner et al—Organische Feldeffekttransistoren Auf Basis Halbleitender Polymere/Organic Field-Effect Transistors Based on Semiconducting Polymers. Elektrotechnik und Informationstechnik, Springer Verlag. 2003 vol. 120 No. 6, pp. 205-209.

Schwendeman et al; Pertluoroalkanoate-substituted PEDOT for Electronic Device Applications, Advanced Functional Materials, vol. 13, No. 7, 2003, pp. 541-547.

Sharpe et al—Improved Cationic Conductive Polymer, Calgon Corp, Coating Conference (Proceeding) 1981 pp. 83-87.

Simpson et al.—Advances and Applications of Inherently Conductive Polymer Technologies Based on Poly(3,4-Ethylenedioxythiophene) 2005 AIMCAL Fall Technical Conference.

Sotzing et al., "Poly(thieno(3,4-b)thiophene): A p- and n-Dopable Polythiophene Exhibiting High Optical Transparency in the Semiconducting State," Macromolecules, 2002, vol. 35, pp. 7281-7286.

Stejskal et al., "Polyaniline Dispersions 10. Coloured Microparticles of Variable Density Prepared Using Stabilizer Mixtures," Colloid Polymer Science, vol. 278, 2000, pp. 654-658.

Tang et al., "Organic/Inorganic Material for Coating on Metals," Materials Research Society Symp. Proc., vol. 734, 2003, pp. B.9.57.1-B.9.57.7.

Thelakkat et al—Poly(Triarylamine)S-Synthesis and Application in Electroluminescent Devices and Photovoltaics, Synthetic Metals, 1999, vol. 102 pp. 1125-1128.

Thess et al., Crystalline Ropes of Metallic Carbon Nanotubes, Science, 1996 vol. 273 pp. 483-487.

Wang—Photoconductive Materials, Kirk-Othmer Encyclopedia of Chemical Technology, Fourth Edition, 1996, vol. 18 pp. 837-860.

Wu et al, Transparent, Conductive Carbon Nanotube Files, Science, 2004, vol. 305, pp. 1273-1276.

Yang S-M et al: "The photoelectrochemical properties of TiO2 electrodes modified by quantum sized PbS and thiols", Synthetic Metals, vol. 123, No. 2, Sep. 4, 2001, pp. 267-272.

Yuan Y F et al: "Size and morphology effects of ZnO anode nanomaterials for Zn/Ni secondary batteries; Size and morphology effects of ZnO anode nanomaterials for Zn/Ni secondary batteries", Nanotechnology, vol. 16, No. 6, Jun. 1, 2005, pp. 803-808.

Extended European Search Report, EP 10005557.3, December 1, 2010.

Extended European Search Report for Application No. EP 10 01 1570; May 17, 2011.

Extended European Search Report for Application No. 08866235.8; Mar. 19, 2012.

PCT International Search Report for PCT/US2003/030509; C. Meiners Authorized Officer; Feb. 17, 2004.

PCT International Search Report for PCT/US2005/008561; G. Wolfbauer Authorized Officer; Jun. 30, 2005.

PCT International Search Report for International Application No. PCT/US08/070718; Benedikt Schlicke Authorized Officer; Oct. 31, 2008.

PCT International Search Report for International Application No. PCT/US2009/037461; Christian Meiners Authorized Officer Jan. 7, 2009.

PCT International Search Report for International Application No. PCT/US08/88089; Lee W. Young Authorized Officer Feb. 18, 2009.

PCT International Search Report for International Application No. PCT/US09/35079; Lee W. Young Authorized Officer Apr. 9, 2009.

PCT International Search Report for International Application No. PCT/US2010/031836; Rahn Kim Authorized Officer Dec. 17, 2010.

PCT International Search Report for International Application No. PCT/US2010/032175; Kim Rahn Authorized Officer Dec. 20, 2010.

Opposition Against EP 1726051, Opposition Document from Herzog Fiesser & Partner representing Heraeus Precious Metals GmbH; Sep. 15, 2011 [English Translation].

Opposition Against EP 1726051, Opposition Document from Herzog Fiesser & Partner representing Heraeus Precious Metals GmbH; Sep. 15, 2011 [German Original].

Supplemental European Search Report for Application No. 10767815.3, corresponding to U.S. Appl. No. 13/265,002; Dec. 10, 2013.

* cited by examiner

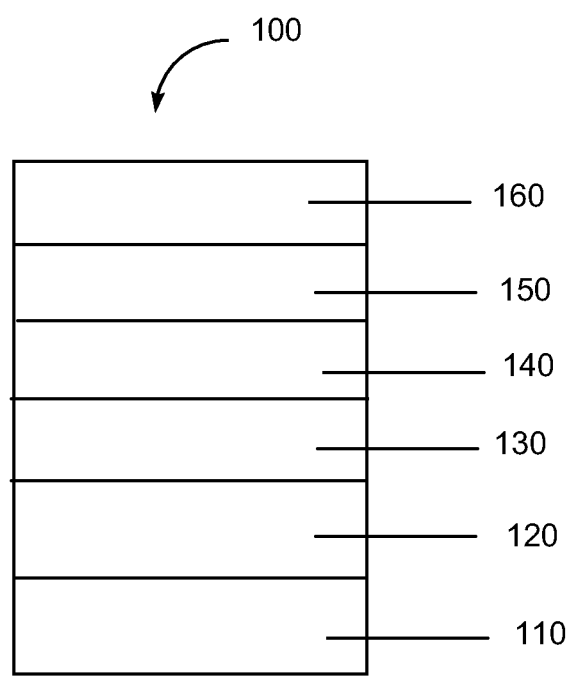

ELECTRICALLY CONDUCTIVE POLYMER COMPOSITIONS AND FILMS MADE THEREFROM

RELATED APPLICATION

This application claims priority under 35 U.S.C. §119(e) from Provisional Application No. 61/172,396 filed Apr. 24, 2009 which is incorporated by reference in its entirety.

BACKGROUND INFORMATION

1. Field of the Disclosure

This disclosure relates in general to aqueous dispersions of electrically conductive polymers containing additives, and their use in electronic devices.

2. Description of the Related Art

Electronic devices define a category of products that include an active layer. Organic electronic devices have at least one organic active layer. Such devices convert electrical energy into radiation such as light emitting diodes, detect signals through electronic processes, convert radiation into electrical energy, such as photovoltaic cells, or include one or more organic semiconductor layers.

Organic light-emitting diodes (OLEDs) are an organic electronic device comprising an organic layer capable of electroluminescence. OLEDs containing conducting polymers can have the following configuration:

anode/hole injection layer/EL material/cathode with additional layers between the electrodes. The anode is typically any material that has the ability to inject holes into the EL material, such as, for example, indium/tin oxide (ITO). The anode is optionally supported on a glass or plastic substrate. EL materials include fluorescent compounds, fluorescent and phosphorescent metal complexes, conjugated polymers, and mixtures thereof. The cathode is typically any material (such as, e.g., Ca or Ba) that has the ability to inject electrons into the EL material. Electrically conducting polymers having low conductivity in the range of $10^{-3}$ to $10^{-7}$ S/cm are commonly used as the hole injection layer in direct contact with an electrically conductive, inorganic oxide anode such as ITO.

There is a continuing need for improved organic conductive materials.

SUMMARY

There is provided an aqueous dispersion comprising: (i) at least one electrically conductive polymer doped with at least one non-fluorinated polymeric acid; (ii) at least one highly-fluorinated acid polymer; and (iii) electrically insulative oxide nanoparticles.

In another embodiment, there is provided a film formed from the above dispersion.

In another embodiment, electronic devices comprising at least one layer comprising the above film are provided.

BRIEF DESCRIPTION OF THE DRAWINGS

The invention is illustrated by way of example and not limitation in the accompanying figures.

FIG. 1 is a schematic diagram of an organic electronic device.

Skilled artisans will appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

There is provided an aqueous dispersion comprising: (i) at least one electrically conductive polymer doped with at least one non-fluorinated polymeric acid; (ii) at least one highly-fluorinated acid polymer; and (iii) electrically insulative oxide nanoparticles. The above dispersion is referred to herein as the "new composite dispersion". In some embodiments, the new composite dispersion consists essentially of (i) at least one electrically conductive polymer doped with at least one non-fluorinated polymeric acid; (ii) at least one highly-fluorinated acid polymer; and (iii) electrically insulative oxide nanoparticles.

Many aspects and embodiments are described herein and are merely exemplary and not limiting. After reading this specification, skilled artisans will appreciate that other aspects and embodiments are possible without departing from the scope of the invention.

Other features and benefits of any one or more of the embodiments will be apparent from the following detailed description, and from the claims. The detailed description first addresses Definitions and Clarification of Terms followed by the Doped Electrically Conductive Polymer, the Highly-Fluorinated Acid Polymer, the Electrically Insulative Oxide Nanoparticles, Preparation of the New Composite Dispersion, Hole Injection Layers, Electronic Devices, and finally, Examples.

1. Definitions and Clarification of Terms Used in the Specification and Claims Before addressing details of embodiments described below, some terms are defined or clarified.

The term "acid polymer" refers to a polymer having acidic groups.

The term "acidic group" refers to a group capable of ionizing to donate a hydrogen ion to a Brønsted base.

The term "aqueous" refers to a liquid that has a significant portion of water, and in one embodiment it is at least about 60% by weight water.

The term "conductive" or "electrically conductive" as it refers to a material, is intended to mean a material which is inherently or intrinsically capable of electrical conductivity without the addition of carbon black or conductive metal particles.

The term "conductor" and its variants are intended to refer to a layer material, member, or structure having an electrical property such that current flows through such layer material, member, or structure without a substantial drop in potential. The term is intended to include semiconductors. In some embodiments, a conductor will form a layer having a conductivity of at least $10^{-7}$ S/cm.

The term "doped" as it refers to an electrically conductive polymer, is intended to mean that the electrically conductive polymer has a polymeric counterion to balance the charge on the conductive polymer.

The term "doped conductive polymer" is intended to mean the conductive polymer and the polymeric counterion that is associated with it.

The term "electrically insulative" as it refers to oxide nanoparticles, is intended to mean that the addition of any amount of such nanoparticles to a composition or film does not increase the conductivity of such composition or film.

The term "electron transport" means when referring to a layer, material, member or structure, such a layer, material, member or structure that promotes or facilitates migration of negative charges through such a layer, material, member or structure into another layer, material, member or structure.

The prefix "fluoro" indicates that one or more available hydrogen atoms have been replaced with a fluorine atom. The terms "fully-fluorinated" and "perfluorinated" are used interchangeably and refer to a compound where all of the available hydrogens bonded to carbon have been replaced by fluorine. The term "highly-fluorinated" refers to a compound in which at least 80% of the available hydrogens bonded to carbon have been replaced by fluorine. Such materials are referred to as being at least 80% fluorinated. The term "non-fluorinated" refers to a compound in which less than 25% of the available hydrogens bonded to carbon have been replaced by fluorine. Such materials are referred to as being less than 25% fluorinated.

The term "hole transport" when referring to a layer, material, member, or structure, is intended to mean such layer, material, member, or structure facilitates migration of positive charges through the thickness of such layer, material, member, or structure with relative efficiency and small loss of charge.

The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer.

The term "nanoparticle" refers to a material having a particle size less than 50 nm at cumulative 50% volume distribution.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode).

The term "polymer" is intended to mean a material having at least one repeating monomeric unit. The term includes homopolymers having only one kind, or species, of monomeric unit, and copolymers having two or more different monomeric units, including copolymers formed from monomeric units of different species.

The term "semiconductive" is intended to refer to a material having characteristics of a semiconductor; that is having electrical conductivity greater than insulators but less than good conductors.

The term "wettable" as it refers to a film, is intended to mean that an organic solvent will spread evenly across the surface of the film.

The term "work function" is intended to mean the minimum energy needed to remove an electron from a conductive or semiconductive material to a point at infinite distance away from the surface. The work-function can be obtained by UPS (Ultraviolet Photoemission Spectroscopy), Kelvin-probe contact potential differential measurement, or low intensity X-ray photoemission spectroscopy (LIXPS). LIXPS was used exclusively in examples herein.

Although light-emitting materials may also have some charge transport properties, the terms "hole transport layer, material, member, or structure" and "electron transport layer, material, member, or structure" are not intended to include a layer, material, member, or structure whose primary function is light emission.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics,* $81^{st}$ Edition (2000-2001).

Unless otherwise defined, all technical and scientific terms used herein have the same meaning as commonly understood by one of ordinary skill in the art to which this invention belongs. In the Formulae, the letters Q, R, T, W, X, Y, and Z are used to designate atoms or groups which are defined within. All other letters are used to designate conventional atomic symbols. Group numbers corresponding to columns within the Periodic Table of the elements use the "New Notation" convention as seen in the *CRC Handbook of Chemistry and Physics,* $81^{st}$ Edition (2000).

To the extent not described herein, many details regarding specific materials, processing acts, and circuits are conventional and may be found in textbooks and other sources within the organic light-emitting diode display, lighting source, photodetector, photovoltaic, and semiconductive member arts.

2. Doped Electrically Conductive Polymers

The doped electrically conductive polymer has a polymeric counterion derived from a non-fluorinated polymeric acid to balance the charge on the conductive polymer.

a. Electrically Conductive Polymer

Any electrically conductive polymer can be used in the new composite dispersion. In some embodiments, the electrically conductive polymer will form a film which has a conductivity in the range of $1\times10^{-3}$ to $1\times10^{-7}$ S/cm. Thus, the new composite dispersions described herein can be used to form films having a conductivity greater than about $1\times10^{-7}$ S/cm, but greater than $1\times10^{-3}$ S/cm.

The conductive polymers suitable for the new composite dispersion are made from at least one monomer which, when polymerized alone, forms an electrically conductive homopolymer. Such monomers are referred to herein as "conductive precursor monomers." Monomers which, when polymerized alone form homopolymers which are not electrically conductive, are referred to as "non-conductive precursor monomers." The conductive polymer can be a homopolymer or a copolymer. Conductive copolymers suitable for the new composite dispersion can be made from two or more conductive precursor monomers or from a combination of one or more conductive precursor monomers and one or more non-conductive precursor monomers.

In some embodiments, the conductive polymer is made from at least one conductive precursor monomer selected from thiophenes, pyrroles, anilines, and polycyclic aromatics. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring.

In some embodiments, the conductive polymer is made from at least one precursor monomer selected from thiophenes, selenophenes, tellurophenes, pyrroles, anilines, and polycyclic aromatics. The polymers made from these monomers are referred to herein as polythiophenes, poly(selenophenes), poly(tellurophenes), polypyrroles, polyanilines, and polycyclic aromatic polymers, respectively. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring. In some embodiments, the polycyclic aromatic polymers are poly(thienothiophenes).

In some embodiments, monomers contemplated for use to form the electrically conductive polymer in the new composite dispersion comprise Formula I below:

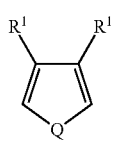

(I)

wherein:
Q is selected from the group consisting of S, Se, and Te;
$R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, selenium, tellurium, sulfur or oxygen atoms.

As used herein, the term "alkyl" refers to a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like. The term "alkylene" refers to an alkyl group having two points of attachment.

As used herein, the term "alkenyl" refers to a group derived from an aliphatic hydrocarbon having at least one carbon-carbon double bond, and includes linear, branched and cyclic groups which may be unsubstituted or substituted. The term "heteroalkenyl" is intended to mean an alkenyl group, wherein one or more of the carbon atoms within the alkenyl group has been replaced by another atom, such as nitrogen, oxygen, sulfur, and the like. The term "alkenylene" refers to an alkenyl group having two points of attachment.

As used herein, the following terms for substituent groups refer to the formulae given below:

| | |
|---|---|
| "alcohol" | —$R^3$—OH |
| "amido" | —$R^3$—C(O)N($R^6$)$R^6$ |
| "amidosulfonate" | —$R^3$—C(O)N($R^6$)$R^4$—$SO_3$Z |
| "benzyl" | —$CH_2$—$C_6H_5$ |
| "carboxylate" | —$R^3$—C(O)O—Z or —$R^3$—O—C(O)—Z |
| "ether" | —$R^3$—(O—$R^5$)$_p$—O—$R^5$ |
| "ether carboxylate" | —$R^3$—O—$R^4$—C(O)O—Z or —$R^3$—O—$R^4$—O—C(O)—Z |
| "ether sulfonate" | —$R^3$—O—$R^4$—$SO_3$Z |
| "ester sulfonate" | —$R^3$—O—C(O)—$R^4$—$SO_3$Z |
| "sulfonimide" | —$R^3$—$SO_2$—NH—$SO_2$—$R^5$ |
| "urethane" | —$R^3$—O—C(O)—N($R^6$)$_2$ | where all "R" groups are the same or different at each occurrence and:
$R^3$ is a single bond or an alkylene group
$R^4$ is an alkylene group
$R^5$ is an alkyl group
$R^6$ is hydrogen or an alkyl group
p is 0 or an integer from 1 to 20
Z is H, alkali metal, alkaline earth metal, $N(R^5)_4$ or $R^5$ Any of the above groups may further be unsubstituted or substituted, and any group may have F substituted for one or more hydrogens, including perfluorinated groups. In some embodiments, the alkyl and alkylene groups have from 1-20 carbon atoms.

In some embodiments, in the monomer, both $R^1$ together form —W—$(CY^1Y^2)_m$—W—, where m is 2 or 3, W is O, S, Se, PO, $NR^6$, $Y^1$ is the same or different at each occurrence and is hydrogen or fluorine, and $Y^2$ is the same or different at each occurrence and is selected from hydrogen, halogen, alkyl, alcohol, amidosulfonate, benzyl, carboxylate, ether, ether carboxylate, ether sulfonate, ester sulfonate, and urethane, where the Y groups may be partially or fully fluorinated. In some embodiments, all Y are hydrogen. In some embodiments, the polymer is poly(3,4-ethylenedioxythiophene) ("PEDOT"). In some embodiments, at least one Y group is not hydrogen. In some embodiments, at least one Y group is a substituent having F substituted for at least one hydrogen. In some embodiments, at least one Y group is perfluorinated.

In some embodiments, the monomer has Formula I(a):

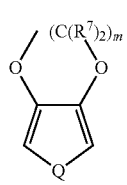

(Ia)

wherein:
Q is selected from the group consisting of S, Se, and Te;
$R^7$ is the same or different at each occurrence and is selected from hydrogen, alkyl, heteroalkyl, alkenyl, heteroalkenyl, alcohol, amidosulfonate, benzyl, carboxylate, ether, ether carboxylate, ether sulfonate, ester sulfonate, and urethane, with the proviso that at least one $R^7$ is not hydrogen, and m is 2 or 3.

In some embodiments of Formula I(a), m is two, one $R^7$ is an alkyl group of more than 5 carbon atoms, and all other $R^7$ are hydrogen.

In some embodiments of Formula I(a), at least one $R^7$ group is fluorinated. In some embodiments, at least one $R^7$ group has at least one fluorine substituent. In some embodiments, the $R^7$ group is fully fluorinated.

In some embodiments of Formula I(a), the $R^7$ substituents on the fused alicyclic ring on the monomer offer improved solubility of the monomers in water and facilitate polymerization in the presence of the fluorinated acid polymer.

In some embodiments of Formula I(a), m is 2, one $R^7$ is sulfonic acid-propylene-ether-methylene and all other $R^7$ are hydrogen. In some embodiments, m is 2, one $R^7$ is propyl-ether-ethylene and all other $R^7$ are hydrogen. In some embodiments, m is 2, one $R^7$ is methoxy and all other $R^7$ are hydrogen. In some embodiments, one $R^7$ is sulfonic acid difluoromethylene ester methylene (—$CH_2$—O—C(O)—$CF_2$—$SO_3H$), and all other $R^7$ are hydrogen.

In some embodiments, pyrrole monomers contemplated for use to form the electrically conductive polymer in the new composite dispersion comprise Formula II below.

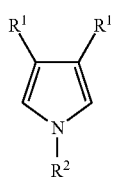

(II)

where in Formula II:
  $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur, selenium, tellurium, or oxygen atoms; and
  $R^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, ester sulfonate, and urethane.

In some embodiments, $R^1$ is the same or different at each occurrence and is independently selected from hydrogen, alkyl, alkenyl, alkoxy, cycloalkyl, cycloalkenyl, alcohol, benzyl, carboxylate, ether, amidosulfonate, ether carboxylate, ether sulfonate, ester sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In some embodiments, $R^2$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In some embodiments, the pyrrole monomer is unsubstituted and both $R^1$ and $R^2$ are hydrogen. Unsubstituted polypyrrole is abbreviated herein as "PPy".

In some embodiments, both $R^1$ together form a 6- or 7-membered alicyclic ring, which is further substituted with a group selected from alkyl, heteroalkyl, alcohol, benzyl, carboxylate, ether, ether carboxylate, ether sulfonate, ester sulfonate, and urethane. These groups can improve the solubility of the monomer and the resulting polymer. In some embodiments, both $R^1$ together form a 6- or 7-membered alicyclic ring, which is further substituted with an alkyl group. In some embodiments, both $R^1$ together form a 6- or 7-membered alicyclic ring, which is further substituted with an alkyl group having at least 1 carbon atom.

In some embodiments, both $R^1$ together form —O—$(CHY)_m$—O—, where m is 2 or 3, and Y is the same or different at each occurrence and is selected from hydrogen, alkyl, alcohol, benzyl, carboxylate, amidosulfonate, ether, ether carboxylate, ether sulfonate, ester sulfonate, and urethane. In some embodiments, at least one Y group is not hydrogen. In some embodiments, at least one Y group is a substituent having F substituted for at least one hydrogen. In some embodiments, at least one Y group is perfluorinated.

In some embodiments, aniline monomers contemplated for use to form the electrically conductive polymer in the new composite dispersion comprise Formula III below.

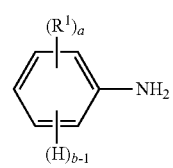

(III)

wherein:
  a is 0 or an integer from 1 to 4;
  b is an integer from 1 to 5, with the proviso that a+b=5; and
  $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms.

When polymerized, the aniline monomeric unit can have Formula IV(a) or Formula IV(b) shown below, or a combination of both formulae.

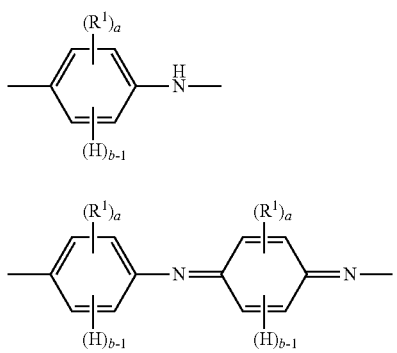

(IV(a))

(IV(b))

where a, b and $R^1$ are as defined above.

In some embodiments, the aniline monomer is unsubstituted and a=0.

In some embodiments, a is not 0 and at least one $R^1$ is fluorinated. In some embodiments, at least one $R^1$ is perfluorinated.

In some embodiments, fused polycylic heteroaromatic monomers contemplated for use to form the electrically conductive polymer in the new composite dispersion have two or more fused aromatic rings, at least one of which is heteroaromatic. In some embodiments, the fused polycyclic heteroaromatic monomer has Formula V:

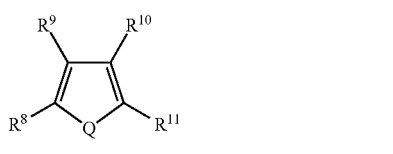

(V)

wherein:

Q is S, Se, Te, or $NR^6$;

$R^6$ is hydrogen or alkyl;

$R^8$, $R^9$, $R^{10}$, and $R^{11}$ are independently selected so as to be the same or different at each occurrence and are selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; and at least one of $R^8$ and $R^9$, $R^9$ and $R^{10}$, and $R^{10}$ and $R^{11}$ together form an alkenylene chain completing a 5 or 6-membered aromatic ring, which ring may optionally include one or more divalent nitrogen, sulfur, selenium, tellurium, or oxygen atoms.

In some embodiments, the fused polycyclic heteroaromatic monomer has a formula selected from the group consisting of Formula V(a), V(b), V(c), V(d), V(e), V(f), V(g), V(h), V(i), V(j), and V(k):

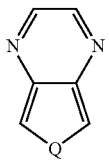

(Vj)

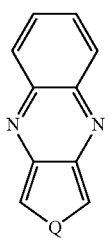

(Vk)

wherein:

Q is S, Se, Te, or NH; and

T is the same or different at each occurrence and is selected from S, NR$^6$, O, SiR$^6_2$, Se, Te, and PR$^6$;

Y is N; and

R$^6$ is hydrogen or alkyl.

The fused polycyclic heteroaromatic monomers may be further substituted with groups selected from alkyl, heteroalkyl, alcohol, benzyl, carboxylate, ether, ether carboxylate, ether sulfonate, ester sulfonate, and urethane. In some embodiments, the substituent groups are fluorinated. In some embodiments, the substituent groups are fully fluorinated.

In some embodiments, the fused polycyclic heteroaromatic monomer is a thieno(thiophene). Such compounds have been discussed in, for example, Macromolecules, 34, 5746-5747 (2001); and Macromolecules, 35, 7281-7286 (2002). In some embodiments, the thieno(thiophene) is selected from thieno(2,3-b)thiophene, thieno(3,2-b)thiophene, and thieno(3,4-b)thiophene. In some embodiments, the thieno(thiophene) monomer is further substituted with at least one group selected from alkyl, heteroalkyl, alcohol, benzyl, carboxylate, ether, ether carboxylate, ether sulfonate, ester sulfonate, and urethane. In some embodiments, the substituent groups are fluorinated. In some embodiments, the substituent groups are fully fluorinated.

In some embodiments, polycyclic heteroaromatic monomers contemplated for use to form the polymer in the new composite dispersion comprise Formula VI:

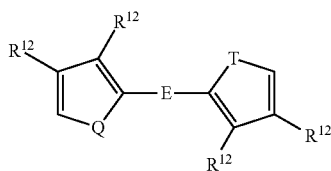

(VI)

wherein:

Q is S, Se, Te, or NR$^6$;

T is selected from S, NR$^6$, O, SiR$^6_2$, Se, Te, and PR$^6$;

E is selected from alkenylene, arylene, and heteroarylene;

R$^6$ is hydrogen or alkyl;

R$^{12}$ is the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; or both R$^{12}$ groups together may form an alkylene or alkenylene chain completing a 3, 4, 5, 6, or 7-membered aromatic or alicyclic ring, which ring may optionally include one or more divalent nitrogen, sulfur, selenium, tellurium, or oxygen atoms.

In some embodiments, the electrically conductive polymer is a copolymer of a precursor monomer and at least one second monomer. Any type of second monomer can be used, so long as it does not detrimentally affect the desired properties of the copolymer. In some embodiments, the second monomer comprises no more than 50% of the polymer, based on the total number of monomer units. In some embodiments, the second monomer comprises no more than 30%, based on the total number of monomer units. In some embodiments, the second monomer comprises no more than 10%, based on the total number of monomer units.

Exemplary types of second monomers include, but are not limited to, alkenyl, alkynyl, arylene, and heteroarylene. Examples of second monomers include, but are not limited to, fluorene, oxadiazole, thiadiazole, benzothiadiazole, phenylenevinylene, phenyleneethynylene, pyridine, diazines, and triazines, all of which may be further substituted.

In some embodiments, the copolymers are made by first forming an intermediate precursor monomer having the structure A-B-C, where A and C represent precursor monomers, which can be the same or different, and B represents a second monomer. The A-B-C intermediate precursor monomer can be prepared using standard synthetic organic techniques, such as Yamamoto, Stille, Grignard metathesis, Suzuki, and Negishi couplings. The copolymer is then formed by oxidative polymerization of the intermediate precursor monomer alone, or with one or more additional precursor monomers.

In some embodiments, the electrically conductive polymer is selected from the group consisting of a polythiophene, a polyaniline, a polypyrrole, a polymeric fused polycyclic heteroaromatic, a copolymer thereof, and combinations thereof.

In some embodiments, the electrically conductive polymer is selected from the group consisting of poly(3,4-ethylenedioxythiophene), unsubstituted polyaniline, unsubstituted polypyrrole, poly(4-aminoindole), poly(7-aminoindole), poly(thieno(2,3-b)thiophene), poly(thieno(3,2-b)thiophene), and poly(thieno(3,4-b)thiophene).

b. Non-Fluorinated Polymeric Acid

Any non-fluorinated polymeric acid, which is capable of doping the conductive polymer, can be used to make the new composite dispersions. In some embodiments, the non-fluorinated polymeric acid is less than 10% fluorinated; in some embodiments, less than 1% fluorinated. In some embodiments, the non-fluorinated polymeric acid has no fluorines.

The use of such acids with conducting polymers such as polythiophenes, polyanilines and polypyrroles is well known in the art. Examples of acidic groups include, but are not limited to, carboxylic acid groups, sulfonic acid groups, sulfonimide groups, phosphoric acid groups, phosphonic acid groups, and combinations thereof. The acidic groups can all be the same, or the polymer may have more than one type of acidic group.

In one embodiment, the acid is a non-fluorinated polymeric sulfonic acid. Some non-limiting examples of the acids are poly(styrenesulfonic acid) ("PSSA"), poly(2-acrylamido-2-methyl-1-propanesulfonic acid) ("PAAMPSA"), and mixtures thereof.

The amount of non-fluorinated polymeric acid present is generally in excess of that required to counterbalance the charge on the conducting polymer. In some embodiments, the ratio of acid equivalents of non-fluorinated polymeric acid to molar equivalents of conducting polymer is in the range of 1-5.

The amount of doped conducting polymer in the new composite dispersion is generally at least 0.1 wt. %, based on the total weight of the dispersion. In some embodiments, the wt. % is from 0.2 to 5.

The conductivity of films made from the doped polymer is in the range of $1 \times 10^{-3}$ to $1 \times 10^{-7}$ S/cm c. Preparation of Doped Electrically Conductive Polymer The doped electrically conductive polymer is formed by oxidative polymerization of the precursor monomer in the presence of the non-fluorinated polymeric acid in an aqueous medium. Oxidative polymerization of such monomers is well known. Oxidants such as sodium or potassium persulfate may be used. In some cases a catalyst, such as ferric sulfate can also be used. The resulting product is an aqueous dispersion of the doped electrically conductive polymer.

Some doped electrically conductive polymers are available commercially. Examples include PEDOT/PSSA, sold as Clevios™ (previously known as Baytron-P) by H. C. Starck, and PPy/PSSA sold by Aldrich Chemical.

3. Highly-Fluorinated Acid Polymer

The highly-fluorinated acid polymer ("HFAP") is used to enhance the work-function of films made from the new composite dispersion. The HFAP can be any polymer which is highly-fluorinated and has acidic groups with acidic protons. The acidic groups supply an ionizable proton. In some embodiments, the acidic proton has a pKa of less than 3. In some embodiments, the acidic proton has a pKa of less than 0. In some embodiments, the acidic proton has a pKa of less than −5. The acidic group can be attached directly to the polymer backbone, or it can be attached to side chains on the polymer backbone. Examples of acidic groups include, but are not limited to, carboxylic acid groups, sulfonic acid groups, sulfonimide groups, phosphoric acid groups, phosphonic acid groups, and combinations thereof. The acidic groups can all be the same, or the polymer may have more than one type of acidic group. In some embodiments, the acidic groups are selected from the group consisting of sulfonic acid groups, sulfonamide groups, and combinations thereof.

In some embodiments, the HFAP is at least 90% fluorinated; in some embodiments, at least 95% fluorinated; in some embodiments, fully-fluorinated.

In some embodiments, the HFAP is water-soluble. In some embodiments, the HFAP is dispersible in water. In some embodiments, the HFAP is organic solvent wettable.

Examples of suitable polymeric backbones include, but are not limited to, polyolefins, polyacrylates, polymethacrylates, polyimides, polyamides, polyaramids, polyacrylamides, polystyrenes, and copolymers thereof, all of which are highly-fluorinated; in some embodiments, fully-fluorinated.

In one embodiment, the acidic groups are sulfonic acid groups or sulfonimide groups. A sulfonimide group has the formula:

—SO$_2$—NH—SO$_2$—R where R is an alkyl group.

In one embodiment, the acidic groups are on a fluorinated side chain. In one embodiment, the fluorinated side chains are selected from alkyl groups, alkoxy groups, amido groups, ether groups, and combinations thereof, all of which are fully fluorinated.

In one embodiment, the HFAP has a highly-fluorinated olefin backbone, with pendant highly-fluorinated alkyl sulfonate, highly-fluorinated ether sulfonate, highly-fluorinated ester sulfonate, or highly-fluorinated ether sulfonimide groups. In one embodiment, the HFAP is a perfluoroolefin having perfluoro-ether-sulfonic acid side chains. In one embodiment, the polymer is a copolymer of 1,1-difluoroethylene and 2-(1,1-difluoro-2-(trifluoromethyl)allyloxy)-1,1,2,2-tetrafluoroethanesulfonic acid. In one embodiment, the polymer is a copolymer of ethylene and 2-(2-(1,2,2-trifluorovinyloxy)-1,1,2,3,3,3-hexafluoropropoxy)-1,1,2,2-tetrafluoroethanesulfonic acid. These copolymers can be made as the corresponding sulfonyl fluoride polymer and then can be converted to the sulfonic acid form.

In one embodiment, the HFAP is homopolymer or copolymer of a fluorinated and partially sulfonated poly(arylene ether sulfone). The copolymer can be a block copolymer.

In one embodiment, the HFAP is a sulfonimide polymer having Formula IX:

(IX)

where:

R$_f$ is selected from highly-fluorinated alkylene, highly-fluorinated heteroalkylene, highly-fluorinated arylene, and highly-fluorinated heteroarylene, which may be substituted with one or more ether oxygens; and n is at least 4.

In one embodiment of Formula IX, R$_f$ is a perfluoroalkyl group. In one embodiment, R$_f$ is a perfluorobutyl group. In one embodiment, R$_f$ contains ether oxygens. In one embodiment n is greater than 10.

In one embodiment, the HFAP comprises a highly-fluorinated polymer backbone and a side chain having Formula X:

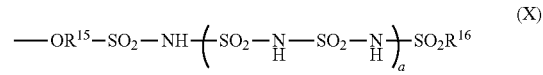

(X)

where:

R$^{15}$ is a highly-fluorinated alkylene group or a highly-fluorinated heteroalkylene group;

R$^{16}$ is a highly-fluorinated alkyl or a highly-fluorinated aryl group; and a is 0 or an integer from 1 to 4.

In one embodiment, the HFAP has Formula XI:

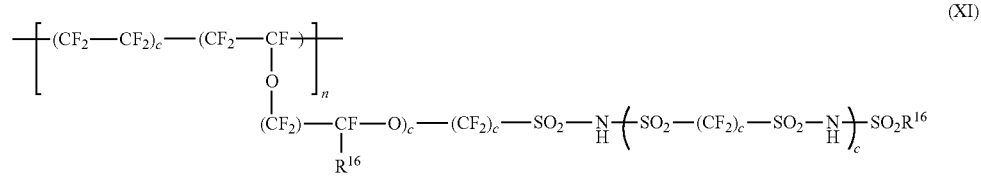

(XI)

where:

$R^{16}$ is a highly-fluorinated alkyl or a highly-fluorinated aryl group;

c is independently 0 or an integer from 1 to 3; and n is at least 4.

The synthesis of HFAPs has been described in, for example, A. Feiring et al., J. Fluorine Chemistry 2000, 105, 129-135; A. Feiring et al., Macromolecules 2000, 33, 9262-9271; D. D. Desmarteau, J. Fluorine Chem. 1995, 72, 203-208; A. J. Appleby et al., J. Electrochem. Soc. 1993, 140(1), 109-111; and Desmarteau, U.S. Pat. No. 5,463,005.

In one embodiment, the HFAP also comprises a repeat unit derived from at least one highly-fluorinated ethylenically unsaturated compound. The perfluoroolefin comprises 2 to 20 carbon atoms. Representative perfluoroolefins include, but are not limited to, tetrafluoroethylene, hexafluoropropylene, perfluoro-(2,2-dimethyl-1,3-dioxole), perfluoro-(2-methylene-4-methyl-1,3-dioxolane), $CF_2=CFO(CF_2)_tCF=CF_2$, where t is 1 or 2, and $R_f''OCF=CF_2$ wherein $R_f''$ is a saturated perfluoroalkyl group of from 1 to about ten carbon atoms. In one embodiment, the comonomer is tetrafluoroethylene.

In one embodiment, the HFAP is a colloid-forming polymeric acid. As used herein, the term "colloid-forming" refers to materials which are insoluble in water, and form colloids when dispersed into an aqueous medium. The colloid-forming polymeric acids typically have a molecular weight in the range of about 10,000 to about 4,000,000. In one embodiment, the polymeric acids have a molecular weight of about 100,000 to about 2,000,000. Colloid particle size typically ranges from 2 nanometers (nm) to about 140 nm. In one embodiment, the colloids have a particle size of 2 nm to about 30 nm. Any highly-fluorinated colloid-forming polymeric material having acidic protons can be used. Some of the polymers described hereinabove may be formed in non-acid form, e.g., as salts, esters, or sulfonyl fluorides. They will be converted to the acid form for the preparation of conductive compositions, described below.

In some embodiments, HFAP include a highly-fluorinated carbon backbone and side chains represented by the formula

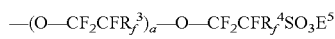

wherein $R_f^3$ and $R_f^4$ are independently selected from F, Cl or a highly-fluorinated alkyl group having 1 to 10 carbon atoms, a=0, 1 or 2, and $E^5$. In some cases $E^5$ can be a cation such as Li, Na, or K, and be converted to the acid form.

In some embodiments, the HFAP can be the polymers disclosed in U.S. Pat. No. 3,282,875 and in U.S. Pat. Nos. 4,358,545 and 4,940,525. In some embodiments, the HFAP comprises a perfluorocarbon backbone and the side chain represented by the formula

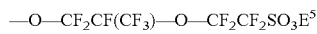

where $E^5$ is as defined above. HFAPs of this type are disclosed in U.S. Pat. No. 3,282,875 and can be made by copolymerization of tetrafluoroethylene (TFE) and the perfluorinated vinyl ether $CF_2=CF-O-CF_2CF(CF_3)-O-CF_2CF_2SO_2F$, perfluoro(3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired ionic form. An example of a polymer of the type disclosed in U.S. Pat. Nos. 4,358,545 and 4,940,525 has the side chain $-O-CF_2CF_2SO_3E^5$, wherein $E^5$ is as defined above. This polymer can be made by copolymerization of tetrafluoroethylene (TFE) and the perfluorinated vinyl ether $CF_2=CF-O-CF_2CF_2SO_2F$, perfluoro(3-oxa-4-pentenesulfonyl fluoride) (POPF), followed by hydrolysis and further ion exchange as necessary.

One type of HFAP is available commercially as aqueous Nafion® dispersions, from E. I. du Pont de Nemours and Company (Wilmington, Del.).

In the new composite dispersion described herein, the ratio of acid equivalent of HFAP to acid equivalent of non-fluorinated doping acid is at least 0.1, and no greater than 2; in some embodiments, no greater than 1.

In some embodiments, the HFAP can be dissolved or dispersed in the high-boiling solvent.

4. Non-Conductive Oxide Nanoparticles

The oxide nanoparticles are electrically insulative and have a particle size no greater than 50 nm at cumulative 50% volume distribution. In some embodiments, the particle size is no greater than 20 nm; in some embodiments, no greater than 10 nm; in some embodiments, no greater than 5 nm.

The oxide can be either a single oxide or mixture of two or more oxides. The shape of the nanoparticles can be, fore example, spherical, elongated, chains, needles, core-shell nanoparticles, or combinations thereof.

Examples of electrically insulative oxides include, but are not limited to, silicon oxide, titanium oxides, zirconium oxide, molybdenum trioxide, vanadium oxide, aluminum oxide, zinc oxide, samarium oxide, yttrium oxide, cesium oxide, cupric oxide, stannic oxide, antimony oxide, tantalum oxides, and the like. Combinations of two or more oxide nanoparticles can be used. In some embodiments, the electrically insulative oxide nanoparticles are selected from the group consisting of silicon dioxide, titanium dioxide, and combinations thereof.

The oxide nanoparticles can be made by the evaporation of the selected oxide, and multi-component oxides, or by vapor-phase hydrolysis of inorganic compounds, for example silicon tetrachloride. It can also be produced by sol-gel chemistry using hydrolyzable metal compounds, particularly alkoxides of various elements, to react with either by hydrolysis and polycondensation to form multi-component and multi-dimensional network oxides.

The weight percentage of electrically insulative oxide nanoparticles in the new dispersion is in the range of 1-20 wt. %, based on the total weight of the dispersion; in some embodiments, 5-10 wt %. The weight ratio of the electrically insulative oxide nanoparticles relative to the total of other solids (doped conducting polymer, HFAP, and optional additives) is at least 0.5; in some embodiments, at least 2. The weight ratio of electrically insulative oxide nanoparticles to conductive polymer is in the range of 0.5 to 10; in some embodiments, 2 to 5.

5. Preparation of the New Composite Dispersion and Films

In the following discussion, the doped conductive polymer, HFAP, and electrically insulative oxide nanoparticles will be referred to in the singular. However, it is understood that more than one of any or all of these may be used.

The new composite dispersion is prepared by first forming the doped conductive polymer and then adding the HFAP, the electrically insulative oxide nanoparticles, and optional additives in any order.

The doped electrically conductive polymer is generally formed by oxidative polymerization of the precursor monomer in the presence of the non-fluorinated polymeric acid in an aqueous medium. Many of these materials are commercially available. The HFAP can be first dissolved or dispersed in the solvent or a solvent/water mixture. The electrically insulative oxide nanoparticles can similarly be dispersed in water or a solvent/water mixture. These mixtures can then be added to an aqueous dispersion of the doped conductive polymer. The electrically insulative oxide nanoparticles can also be dispersed with the HFAP or with the doped conductive polymer.

Alternatively, the electrically insulative oxide nanoparticles can be added to the doped conductive polymer dispersion directly as a solid. The HFAP can be added to this mixture.

The optional additive, when present, can be added at any point. The additive can be added as a dispersion in water or a solvent/water mixture, or it can be added directly as a solid.

In some embodiments, the pH is increased either prior to or after the addition of the electrically insulative oxide nanoparticles and, optionally, the additive. The pH can be adjusted by treatment with cation exchange resins and/or base resins prior to the addition of the electrically insulative oxide nanoparticles and, optionally, the additive. In some embodiments, the pH is adjusted by the addition of aqueous base solution. Cations for the base can be, but are not limited to, alkali metal, alkaline earth metal, ammonium, and alkylammonium. In some embodiments, alkali metal is preferred over alkaline earth metal cations.

Films made from the new composite aqueous dispersions described herein, are hereinafter referred to as "the new films described herein". The films can be made using any liquid deposition technique, including continuous and discontinuous techniques. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

The films thus formed are smooth and relatively transparent.

Films made from aqueous dispersions of electrically conductive polymers doped with at least one non-fluorinated polymeric acid often have low work function. Adding a highly fluorinated polymeric acid can result in increase work function However, films containing highly-fluorinated materials generally have very low surface energies and are not wettable with organic solvents. Surprisingly and unexpectedly, the new films described herein are wettable with organic solvents. In some embodiments, the new films are wettable by a non-polar organic solvent with a contact angle less than 50°. In some embodiments, the new films are wettable by toluene or p-xylene with a contact angle no greater than 40°; in some embodiments, no greater than 35°. In some embodiments, the new films are wettable by anisole with a contact angle no greater than 50°; in some embodiments, no greater than 45°. The methods for measuring contact angles are well known.

The new films described herein have high work function. In some embodiments, the work function is greater than 5.3; in some embodiments, greater than 5.5. Low intensity X-ray photoemission spectroscope (LIXPS) is a technique that has been demonstrated to be very useful in determining the work function of samples that are low in electrical conductivity or are sensitive to photon radiation, as described by Y. Yi, et. al., Journal of Applied Physics 100, 093719 (2006). Compared to Ultraviolet photoemission spectroscope (UPS), the traditional work function measurement technique, this technique uses x rays of very low intensity (one order of magnitude lower than typical X-ray in XPS for elemental analysis, two to three orders of magnitude lower than commercial UV sources in UPS) to circumvent artifacts introduced by photoradiation, such as charging or photochemical reaction, allowing accurate measurement of work function.

6. Hole Injection Layers

Organic light-emitting diodes (OLEDs) are an organic electronic device comprising an organic layer capable of electroluminescence. OLEDs can have the following configuration:

anode/hole injection layer/EL material/cathode with additional layers between the electrodes. Electrically conducting polymers having low conductivity in the range of $10^{-3}$ to $10^{-7}$ S/cm are commonly used as the hole injection layer in direct contact with an electrically conductive, inorganic oxide anode such as ITO.

In another embodiment of the invention, there are provided hole injection layers deposited from the new composite dispersions. The term "hole injection layer" or "hole injection material" is intended to mean electrically conductive or semiconductive materials and may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device. The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

7. Electronic Devices

The new films described herein can be used in electronic devices where the high work function is desired in combination with transparency. In some embodiments, the films are used as hole injection layers.

Examples of electronic devices include, but are not limited to: (1) a device that converts electrical energy into radiation (e.g., a light-emitting diode, light emitting diode display, diode laser, or lighting panel), (2) a device that detects a signal using an electronic process (e.g., a photodetector, a photoconductive cell, a photoresistor, a photoswitch, a phototransistor, a phototube, an infrared ("IR") detector, or a biosensors), (3) a device that converts radiation into electrical energy (e.g., a photovoltaic device or solar cell), (4) a device that includes one or more electronic components that include one or more organic semiconductor layers (e.g., a transistor or diode), (5) an electrolytic capacitor, or any combination of devices in items (1) through (5).

In some embodiments, there are provided electronic devices comprising at least one electroactive layer positioned between two electrical contact layers, wherein the device further includes the new hole injection layer. The term "electroactive" when referring to a layer or material is intended to mean a layer or material that exhibits electronic or electroradiative properties. An electroactive layer material may emit radiation or exhibit a change in concentration of electron-hole pairs when receiving radiation.

As shown in FIG. 1, one embodiment of a device, 100, has an anode layer 110, an electroactive layer 140, and a cathode layer 160. Also shown the hole injection layer 120; an optional hole transport layer 130; and an optional electron injection/transport layer 150.

The device may include a support or substrate (not shown) that can be adjacent to the anode layer 110 or the cathode layer 160. Most frequently, the support is adjacent the anode layer 110. The support can be flexible or rigid, organic or inorganic. Examples of support materials include, but are not limited to, glass, ceramic, metal, and plastic films.

The anode layer 110 is an electrode that is more efficient for injecting holes compared to the cathode layer 160. Thus, the anode has a higher work-function than the cathode. The anode can include materials containing a metal, mixed metal, alloy, metal oxide or mixed oxide. Suitable materials include the mixed oxides of the Group 2 elements (i.e., Be, Mg, Ca, Sr, Ba, Ra), the Group 11 elements, the elements in Groups 4, 5, and 6, and the Group 8-10 transition elements. If the anode layer 110 is to be light transmitting, mixed oxides of Groups 12, 13 and 14 elements may be used. As used herein, the phrase "mixed oxide" refers to oxides having two or more different cations selected from the Group 2 elements or the Groups 12, 13, or 14 elements. Examples of suitable materials include, but are not limited to, indium-tin-oxide ("ITO"), indium-zinc-oxide ("IZO"), aluminum-tin-oxide ("ATO"), aluminum-zinc-oxide ("AZO"), zirconium-tin-oxide ("ZTO"), gold, silver, copper, and nickel.

In some embodiments, the mixed oxide layer is patterned. The pattern may vary as desired. The layer can be formed in a pattern by, for example, using a discontinuous deposition technique. Alternatively, the layer can be applied as an overall layer (also called blanket deposit) and subsequently patterned using, for example, a patterned resist layer and wet chemical or dry etching techniques. Other processes for patterning that are well known in the art can also be used.

Hole injection layer 120 comprises the new film described herein. In some embodiments, the hole injection layer consists essentially of a film made from the aqueous composition described herein.

In some embodiments, optional hole transport layer 130 is present. between hole injection layer 120 and electroactive layer 140. Examples of hole transport materials for the hole transport layer have been summarized for example, in Kirk-Othmer Encyclopedia of Chemical Technology, Fourth Edition, Vol. 18, p. 837-860, 1996, by Y. Wang. Both hole transporting small molecules and polymers can be used. Commonly used hole transporting molecules include, but are not limited to: 4,4',4''-tris(N,N-diphenyl-amino)-triphenylamine (TDATA); 4,4',4''-tris(N-3-methylphenyl-N-phenylamino)-triphenylamine (MTDATA); N,N'-diphenyl-N,N'-bis(3-methylphenyl)-[1,1'-biphenyl]-4,4'-diamine (TPD); 4,4'-bis(carbazol-9-yl)biphenyl (CBP); 1,3-bis(carbazol-9-yl) benzene (mCP); 1,1-bis[(di-4-tolylamino)phenyl] cyclohexane (TAPC); N,N'-bis(4-methylphenyl)-N,N'-bis(4-ethylphenyl)-[1,1'-(3,3'-dimethyl)biphenyl]-4,4'-diamine (ETPD); tetrakis-(3-methylphenyl)-N,N,N',N'-2,5-phenylenediamine (PDA); α-phenyl-4-N,N-diphenylaminostyrene (TPS); p-(diethylamino)benzaldehyde diphenylhydrazone (DEH); triphenylamine (TPA); bis[4-(N,N-diethylamino)-2-methylphenyl](4-methylphenyl)methane (MPMP); 1-phenyl-3-[p-(diethylamino)styryl]-5-[p-(diethylamino)phenyl]pyrazoline (PPR or DEASP); 1,2-trans-bis (9H-carbazol-9-yl)cyclobutane (DCZB); N,N,N'N,N'-tetrakis(4-methylphenyl)-(1,1'-biphenyl)-4,4'-diamine (TTB); N,N'-bis(naphthalen-1-yl)-N,N'-bis-(phenyl)benzidine (α-NPB); and porphyrinic compounds, such as copper phthalocyanine. Commonly used hole transporting polymers include, but are not limited to, polyvinylcarbazole, (phenylmethyl)polysilane, poly(dioxythiophenes), polyanilines, and polypyrroles. It is also possible to obtain hole transporting polymers by doping hole transporting molecules such as those mentioned above into polymers such as polystyrene and polycarbonate. In some cases, triarylamine polymers are used, especially triarylamine-fluorene copolymers. In some cases, the polymers and copolymers are crosslinkable. Examples of crosslinkable hole transport polymers can be found in, for example, published US patent application 2005-0184287 and published PCT application WO 2005/052027. In some embodiments, the hole transport layer is doped with a p-dopant, such as tetrafluorotetracyanoquinodimethane and perylene-3,4,9,10-tetracarboxylic-3,4,9,10-dianhydride.

Depending upon the application of the device, the electroactive layer 140 can be a light-emitting layer that is activated by an applied voltage (such as in a light-emitting diode or light-emitting electrochemical cell), a layer of material that responds to radiant energy and generates a signal with or without an applied bias voltage (such as in a photodetector). In one embodiment, the electroactive material is an organic electroluminescent ("EL") material. Any EL material can be used in the devices, including, but not limited to, small molecule organic fluorescent compounds, fluorescent and phosphorescent metal complexes, conjugated polymers, and mixtures thereof. Examples of fluorescent compounds include, but are not limited to, chrysenes, pyrenes, perylenes, rubrenes, coumarins, anthracenes, thiadiazoles, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of iridium with phenylpyridine, phenylquinoline, or phenylpyrimidine ligands as disclosed in Petrov et al., U.S. Pat. No. 6,670,645 and Published PCT Applications WO 03/063555 and WO 2004/016710, and organometallic complexes described in, for example, Published PCT Applications WO 03/008424, WO 03/091688, and WO 03/040257, and mixtures thereof. In some cases the small molecule fluorescent or organometallic materials are deposited as a dopant with a host material to improve processing and/or electronic properties. Examples of conjugated polymers include, but are not limited to poly(phenylenevinylenes), polyfluorenes, poly(spirobifluorenes), polythiophenes, poly(p-phenylenes), copolymers thereof, and mixtures thereof.

Optional electron transport layer 150 can function both to facilitate electron injection/transport, and can also serve as a confinement layer to prevent quenching reactions at layer interfaces. More specifically, layer 150 may promote electron mobility and reduce the likelihood of a quenching reaction if layers 140 and 160 would otherwise be in direct contact. Examples of electron transport materials which can be used in the optional electron transport layer 150, include metal chelated oxinoid compounds, including metal quinolate derivatives such as tris(8-hydroxyquinolato)aluminum (AlQ), bis (2-methyl-8-quinolinolato)(p-phenylphenolato) aluminum (BAlq), tetrakis-(8-hydroxyquinolato)hafnium (HfQ) and tetrakis-(8-hydroxyquinolato)zirconium (ZrQ); and azole compounds such as 2-(4-biphenylyl)-5-(4-t-butylphenyl)-1, 3,4-oxadiazole (PBD), 3-(4-biphenylyl)-4-phenyl-5-(4-t-butylphenyl)-1,2,4-triazole (TAZ), and 1,3,5-tri(phenyl-2-benzimidazole)benzene (TPBI); quinoxaline derivatives such as 2,3-bis(4-fluorophenyl)quinoxaline; phenanthrolines such as 4,7-diphenyl-1,10-phenanthroline (DPA) and 2,9-dimethyl-4,7-diphenyl-1,10-phenanthroline (DDPA); and mixtures thereof. In some embodiments, the electron transport layer further comprises an n-dopant. Examples of n-dopants include, but are not limited to Cs or other alkali metals.

The cathode layer 160 is an electrode that is particularly efficient for injecting electrons or negative charge carriers.

The cathode layer 160 can be any metal or nonmetal having a lower work function than the first electrical contact layer (in this case, the anode layer 110). The cathode 160, is an electrode that is particularly efficient for injecting electrons or negative charge carriers. The cathode can be any metal or nonmetal having a lower work function than the anode. Materials for the cathode can be selected from alkali metals of Group 1 (e.g., Li, Cs), the Group 2 (alkaline earth) metals, the Group 12 metals, including the rare earth elements and lanthanides, and the actinides. Materials such as aluminum, indium, calcium, barium, samarium and magnesium, as well as combinations, can be used. Li-containing organometallic compounds, LiF, $Li_2O$, Cs-containing organometallic compounds, CsF, $Cs_2O$, and $Cs_2CO_3$ can also be deposited between the organic layer and the cathode layer to lower the operating voltage. This layer may be referred to as an electron injection layer.

The cathode layer 160 is usually formed by a chemical or physical vapor deposition process. In some embodiments, the cathode layer will be patterned, as discussed above in reference to the anode layer 110.

Other layers in the device can be made of any materials which are known to be useful in such layers upon consideration of the function to be served by such layers.

In some embodiments, an encapsulation layer (not shown) is deposited over the contact layer 160 to prevent entry of undesirable components, such as water and oxygen, into the device 100. Such components can have a deleterious effect on the organic layer 140. In one embodiment, the encapsulation layer is a barrier layer or film. In one embodiment, the encapsulation layer is a glass lid.

Though not depicted, it is understood that the device 100 may comprise additional layers. Other layers that are known in the art or otherwise may be used. In addition, any of the above-described layers may comprise two or more sub-layers or may form a laminar structure. Alternatively, some or all of anode layer 110, the hole injection layer 120, the hole transport layer 130, the electron transport layer 150, cathode layer 160, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; hole injection layer 120, 50-2000 Å, in one embodiment 200-1000 Å; optional hole transport layer 130, 50-2000 Å, in one embodiment 100-1000 Å; electroactive layer 140, 10-2000 Å, in one embodiment 100-1000 Å; optional electron transport layer 150, 50-2000 Å, in one embodiment 100-1000 Å; cathode 160, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

EXAMPLES

General Procedure for Measurement of Electrical Resistance and Calculation of Electrical Conductivity One drop of each dispersion sample was spread on a 3"×1" microscope slide to cover ⅔ area of the slide. Excess of liquid was tilted to one edge of the slide to be soaked-up by a tissue. Once a smooth, homogeneous layer of liquid was ensured, the slide was placed on a flat surface for initial drying at room temperature. The slide was then placed on a hot plate set at 160° C. for 10 minutes. The whole operation was carried out in air. The film containing slide was removed from the hot plate and the film was trimmed to a long strip with a razor blade. Width of the strip ranged from 0.2 cm to 0.7 cm and the length was about 3 cm. Silver paste was then painted perpendicular to the length of the strip to form four electrodes. The two inner parallel electrodes were about 0.3 cm to 0.5 cm apart and were connected to a Keithley model 616 electrometer for measurement of voltage when a known current supplied by a Keithley model 225 Current Source was applied to the two other parallel electrodes. A series of corresponding current/voltage data obtained at room temperature was recorded to see whether Ohm's law was followed. All the samples in Examples and Comparative Examples followed Ohm's law, which provided a more or less identical resistance for the corresponding current/voltage data. Once measured was done, the area in the two inner electrodes was measured for thickness with a Profilometer. Since resistance, thickness, separation length of the two inner electrodes and the width of the filmstrip are known, electrical conductivity is then calculated. The conductivity unit is expressed as S/cm (Siemens per centimeter).

General Procedure for Work Function Measurement:

1 cm×1 cm ITO were first cleaned with water and isopropanol and then UV-zoned for 5 minutes before spin-coating of each sample described in comparative examples and examples. Three drops of each dispersion sample was applied on each ITO substrate and then taken to 4,000 rpm in 08 seconds on a spin-coater, and remained at the speed for one minute. The coated samples were then baked in air at 140° C. for 7 minutes. Samples cooled down in air before being loaded one at a time into the chamber for Low Intensity X-ray Photoemission Spectroscopy (LIXPS). The sample is mounted on a titanium sample holder in a laminar flow hood (in air). Electrical contact is verified by an ohmmeter probing the surface of the sample (on a corner) & the sample holder. The sample & holder is then pumped down from atmospheric pressure to UHV in the loadlock. The sample is moved to an analysis chamber with base pressure around $2\times10^{-11}$ Torr, and an operating pressure around $1\times10^{-10}$ to $2\times10^{-10}$ Torr.

The LIXPS experiments presented in this application were carried out in a commercially available integrated ultrahigh vacuum surface analysis system (SEPCS, Berlin, Germany) using XR50 X-ray source with Mg anode (Mg Kα, 1253.6 eV, gun to sample distance about 6 cm) at 3 W (out of full power of 200 W).

General Procedure for Contact Angle Measurement:

A couple drops of each composition liquid prepared in the Examples were placed on a 3"×2" microscope slide to cover two third of the surface. The liquid was left dried in air to form smooth film and then baked at 120° C. in air for 10 minutes. A drop of p-xylene or anisole was then dropped on the film. The contact between the liquid and the film surface was captured on a display screen for determining the contact angle using a software program.

General Procedure for Nanoparticle Size Measurement:

Nanoparticle dispersed in a liquid was measured at various concentrations using Microtrac Nanotrac based on dynamic light scattering technique. The particle size is summarized in cumulative % of volume distribution.

Comparative Example A

This comparative example illustrates the preparation and properties of a conductive polymer doped with a non-fluorinated polymeric acid and blended with a perfluorinated acid polymer.

Baytron-P® AI4083 is an aqueous dispersion of PEDOT-PSSA from H. C. Starck GmbH (Leverkuson, Germany). PEDOT/PSSA is an abbreviation for poly(3,4-ethylene-dioxythiophene) doped with poly (styrenesulfonic acid), a non-fluorinated polymeric acid. According to the product brochure, the weight ratio of PEDOT to PSSA of the Baytron-P® is 1:6. The work function was measured to be 5.33 eV. Electrical conductivity of thin films was measured to be $1.7\times10^{-4}$ S/cm, and $7.9\times10^{-4}$ S/cm at room temperature.

The HFAP was a copolymer of tetrafluoroethylene (TFE) and perfluoro-3,6-dioxa-4-methyl-7-octenesulfonic acid (PSEPVE), referred to as p-(TFE-PSEPVE). The p-(TFE-PSEPVE) used for the blending was an aqueous colloidal dispersion having an acid equivalent (EW) of 1000. The EW means weight in gram of the polymer per one sulfonic acid group. A 25% (w/w) dispersion of p-(TFE-PSEPVE) in water was made using a procedure similar to the procedure in U.S. Pat. No. 6,150,426, Example 1, Part 2, except that the temperature was approximately 270° C. The dispersion was diluted with water to form a 10.93% (w/w) dispersion for further use.

1.5099 g of the p-(TFE-PSEPVE) were slowly added to 10.0085 g AI4083. Resulting dispersion contains 2.86% solid in which the equivalent acid ratio between p-(TFE-PSEPVE) polymer and PSSA is 0.22. The "equivalent ratio" as used herein, is intended to mean the ratio of the number of acid equivalents of p-(TFE-PSEPVE) polymer to the number of acid equivalent of PSSA. A couple drops of the PEDOT-PSSA/p-(TFE-PSEPVE) dispersion were made into thin films. The work function was determined to be 5.94 eV, which is a high value and effective for OLED applications as a hole injection layer. However, the contact angle was 48.5° with p-xylene. This contact angle is very high, meaning that the surface is not wettable with the organic solvent.

Example 1

This example illustrates the properties of an aqueous dispersion of a conductive polymer doped with a non-fluorinated polymeric acid, a highly-fluorinated acid polymer, and electrically insulative oxide nanoparticles.

2.4928 g of the PEDOT-PSSA/TFE-PSEPVE copolymer dispersion prepared in Comparative Example A were added with 0.3840 g of 21.2% (w/w) silica in ethylene glycol. The silica in ethylene glycol is marketed as EG-ST by Nissan Chemical Company in Houston, Tex. The PEDOT-PSSA/TFE-PSEPVE copolymer/silica dispersion contain 5.31 w % total solid wherein 2.83% is silica and the rest, 2.48%, is PEDOT-PSSA/p-(TFE-PSEPVE). The wt. % of silica with respect to total solids is 53.3%. The ethylene glycol present from the EG-ST is 10.5 wt. %, based on the total weight of the dispersion.

A couple drops of the PEDOT-PSSA/p-(TFE-PSEPVE)/silica dispersion were made into thin films and the work function was determined to be 5.72 eV which drops only 0.24 eV with the silica, as compared to the material in Comparative Example A, but is still very high for OLED applications as a hole injection layer. Moreover, its contact angle with p-xylene dropped from 48.5° to 29° with p-xylene. The drop of the contact angle is quite substantial, which means the film surface is very wettable with the organic solvent.

The silica dispersion in ethylene glycol has a particle size of about 3.9 nanometers (nm) at cumulative 50% volume distribution. The particle size is very small, which makes it effective in rendering the PEDOT-PSSA/p-(TFE-PSEPVE) film surfaces wettable.

Table 1 shows particle size of the silica dispersion in ethylene glycol at three concentrations. It has a particle size of about 3.9 nanometers (nm) at cumulative 50% volume distribution.

TABLE 1

| | Particle Size Distribution | | | | | |
|---|---|---|---|---|---|---|
| SAMPLE ID | RUN # | 5% | 16% | 50% | 84% | 95% |
| EG-ST (21.2% silica) | RUN 1 | 3.310 | 3.500 | 4.000 | 4.650 | 5.150 |
| | RUN 2 | 3.300 | 3.470 | 3.920 | 4.460 | 4.860 |
| | RUN 3 | 3.270 | 3.410 | 3.770 | 4.210 | 4.430 |
| | AVERAGE | 3.293 | 3.460 | 3.897 | 4.440 | 4.813 |
| EG-ST (10.6% silica) | RUN 1 | 3.270 | 3.410 | 3.790 | 4.260 | 4.530 |
| | RUN 2 | 3.260 | 3.390 | 3.720 | 4.140 | 4.360 |
| | RUN 3 | 3.260 | 3.380 | 3.700 | 4.120 | 4.340 |
| | AVERAGE | 3.263 | 3.393 | 3.737 | 4.173 | 4.410 |
| EG-ST (5.3% silica) | RUN 1 | 3.270 | 3.410 | 3.780 | 4.270 | 4.560 |
| | RUN 2 | 3.270 | 3.420 | 3.800 | 4.280 | 4.590 |
| | RUN 3 | 3.270 | 3.410 | 3.780 | 4.260 | 4.550 |
| | AVERAGE | 3.270 | 3.413 | 3.787 | 4.270 | 4.567 |

Comparative Example B

This comparative example illustrates the properties of an aqueous dispersion of a conductive polymer doped with a non-fluorinated polymeric acid blended with a highly-fluorinated acid polymer, where the HFAP is present in a higher concentration than in Comparative Example A.

In this comparative example, PEDOT/PSSA and p-(TFE-PSEPVE) were used. 2.7817 g of the p-(TFE-PSEPVE) was slowly added to 10.0137 g Baytron-P® AI4083. The resulting dispersion contained 3.66% (w/w) solid in which the equivalent acid ratio between p-(TFE-PSEPVE) polymer and PSSA is 0.4. A couple drops of the PEDOT-PSSA/p-(TFE-PSEPVE) dispersion were made into thin films and the work function was determined to be 6.07 eV, which is high and effective for OLED applications as a hole injection layer. However the contact angle with p-xylene was 48.5° and with anisole was 55.8°. These contact angles are very high and the film surface is not wettable with the organic solvents.

Example 2

This example illustrates the properties of an aqueous dispersion of a conductive polymer doped with a non-fluorinated polymeric acid, a highly-fluorinated acid polymer, and electrically insulative oxide nanoparticles.

3.9980 g of the PEDOT-PSSA/TFE-PSEPVE copolymer dispersion prepared in comparative example 2 were added with 1.3784 g of 21.2% (w/w) silica in ethylene glycol. The PEDOT-PSSA/TFE-PSEPVE copolymer/silica dispersion contain 8.16 w % total solid wherein 5.43% is silica and the rest, 2.73%, is PEDOT-PSSA/p(TFE-PSEPVE). The w. % of silica with respect to total solid is 66.5%. The ethylene glycol present from the EG-ST is 20.2 wt. %, based on the total weight of the dispersion.

A couple drops of the PEDOT-PSSA/p-(TFE-PSEPVE)/silica dispersion were made into thin films and work-function was determined to be 5.81 eV which drops only 0.26 eV with the silica, but still very high for OLED application as a hole injection layer. The electrical conductivity of thin films cast from the silica containing dispersion was measured to be $1.7 \times 10^{-4}$ S/cm, and $9.3 \times 10^{-5}$ S/cm at room temperature. The conductivity is similar to the conductivity of Baytron-P® AI4083. The data shows that addition of silica and ethylene glycol do not affect the electrical conductivity.

Moreover, its contact angle with p-xylene and anisole dropped from 48.5° to 30.3°, and 55.8° to 48.1° respectively. The drop of the contact angle is quite substantial, which means the film surfaces are very wettable with the organic solvent.

A summary of all the examples is given in Table 2 below.

TABLE 2

Summary of Properties

| Example | Acid Equiv. Ratio | Silica wt. % | Wf eV | CA p-xylene | CA anisole |
|---|---|---|---|---|---|
| Comp. A | 0.22 | none | 5.94 | 48.5 | |
| Ex. 1 | 0.22 | 53.3 | 5.72 | 29 | |
| Comp. B | 0.4 | none | 6.07 | 48.5 | 55.8 |
| Ex. 2 | 0.4 | 66.5 | 5.81 | 30.3 | 48.1 |

Silica wt % is based on total solids; acid equiv. ratio is acid equivalent ratio of p-(TFE-PSEPVE) to PSSA; Wf is work function; CA is contact angle, in degrees.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

The use of numerical values in the various ranges specified herein is stated as approximations as though the minimum and maximum values within the stated ranges were both being preceded by the word "about." In this manner slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

What is claimed is:

1. An aqueous dispersion comprising:
   (i) at least one electrically conductive polymer doped with a non-fluorinated polymeric acid;
   (ii) at least one highly-fluorinated acid polymer; and
   (iii) electrically insulative oxide nanoparticles, wherein the acid equivalent ratio of the highly-fluorinated acid polymer to the non-fluorinated polymeric acid is no greater than 2.

2. The dispersion of claim 1, wherein the electrically conductive polymer is selected from the group consisting of polythiophenes, poly(selenophenes), poly(tellurophenes), polypyrroles, polyanilines, polycyclic aromatic polymers, copolymers thereof, and combinations thereof.

3. The dispersion of claim 1, wherein the electrically conductive polymer is selected from the group consisting of unsubstituted polyaniline, poly(3,4-ethylenedioxythiophene), unsubstituted polypyrrole, poly(4-aminoindole), poly(7-aminoindole), poly(thieno(2,3-b)thiophene), poly(thieno(3,2-b)thiophene), and poly(thieno(3,4-b) thiophene).

4. The dispersion of claim 1, wherein the highly-fluorinated acid polymer is at least 90% fluorinated.

5. The dispersion of claim 1, wherein the highly-fluorinated acid polymer is selected from a sulfonic acid and a sulfonimide.

6. The dispersion of claim 1, wherein the highly-fluorinated acid polymer is a perfluoroolefin having perfluoroether-sulfonic acid side chains.

7. The dispersion of claim 1, wherein the highly-fluorinated acid polymer is selected from the group consisting of a copolymer of 1,1-difluoroethylene and 2-(1,1-difluoro-2-(trifluoromethyl)allyloxy)-1,1,2,2-tetrafluoroethanesulfonic acid, a copolymer of ethylene and 2-(2-(1,2,2-trifluorovinyloxy)-1,1,2,3,3,3-hexafluoropropoxy)-1,1,2,2-tetrafluoroethanesulfonic acid, a copolymer of tetrafluoroethylene and perfluoro(3,6-dioxa-4-methyl-7-octenesulfonic acid), and a copolymer of tetrafluoroethylene and perfluoro(3-oxa-4-pentenesulfonic acid).

8. The dispersion of claim 1, wherein the electrically insulative oxide nanoparticle is selected from the group consisting of silicon oxide, titanium oxides, zirconium oxide, molybdenum trioxide, vanadium oxide, aluminum oxide, zinc oxide, samarium oxide, yttrium oxide, cesium oxide, cupric oxide, stannic oxide, antimony oxide, tantalum oxides, and combinations thereof.

9. The dispersion of claim 1, wherein the electrically insulative oxide is selected from the group consisting of silicon dioxide, titanium dioxide, and combinations thereof.

10. An electronic device comprising at least one layer made from the dispersion of claim 1.

11. An aqueous dispersion comprising:
(i) at least one electrically conductive polymer doped with a non-fluorinated polymeric acid;
(ii) at least one highly-fluorinated acid polymer; and
(iii) electrically insulative oxide nanoparticles, wherein the electrically insulative oxide nanoparticles have a particle size no greater than 50 nm.

12. The dispersion of claim 11, wherein the electrically conductive polymer is selected from the group consisting of polythiophenes, poly(selenophenes), poly(tellurophenes), polypyrroles, polyanilines, polycyclic aromatic polymers, copolymers thereof, and combinations thereof.

13. The dispersion of claim 11, wherein the electrically conductive polymer is selected from the group consisting of unsubstituted polyaniline, poly(3,4-ethylenedioxythiophene), unsubstituted polypyrrole, poly(4-aminoindole), poly(7-aminoindole), poly(thieno(2,3-b)thiophene), poly(thieno(3,2-b)thiophene), and poly(thieno(3,4-b)thiophene).

14. The dispersion of claim 11, wherein the highly-fluorinated acid polymer is at least 90% fluorinated.

15. The dispersion of claim 11, wherein the highly-fluorinated acid polymer is selected from a sulfonic acid and a sulfonimide.

16. The dispersion of claim 11, wherein the highly-fluorinated acid polymer is a perfluoroolefin having perfluoroether-sulfonic acid side chains.

17. The dispersion of claim 11, wherein the highly-fluorinated acid polymer is selected from the group consisting of a copolymer of 1,1-difluoroethylene and 2-(1,1-difluoro-2-(trifluoromethyl)allyloxy)-1,1,2,2-tetrafluoroethanesulfonic acid, a copolymer of ethylene and 2-(2-(1,2,2-trifluorovinyloxy)-1,1,2,3,3,3-hexafluoropropoxy)-1,1,2,2-tetrafluoroethanesulfonic acid, a copolymer of tetrafluoroethylene and perfluoro(3,6-dioxa-4-methyl-7-octenesulfonic acid), and a copolymer of tetrafluoroethylene and perfluoro(3-oxa-4-pentenesulfonic acid).

18. The dispersion of claim 11, wherein the electrically insulative oxide nanoparticle is selected from the group consisting of silicon oxide, titanium oxides, zirconium oxide, molybdenum trioxide, vanadium oxide, aluminum oxide, zinc oxide, samarium oxide, yttrium oxide, cesium oxide, cupric oxide, stannic oxide, antimony oxide, tantalum oxides, and combinations thereof.

19. The dispersion of claim 11, wherein the electrically insulative oxide is selected from the group consisting of silicon dioxide, titanium dioxide, and combinations thereof.

20. An electronic device comprising at least one layer made from the dispersion of claim 11.

* * * * *